Figure 9:
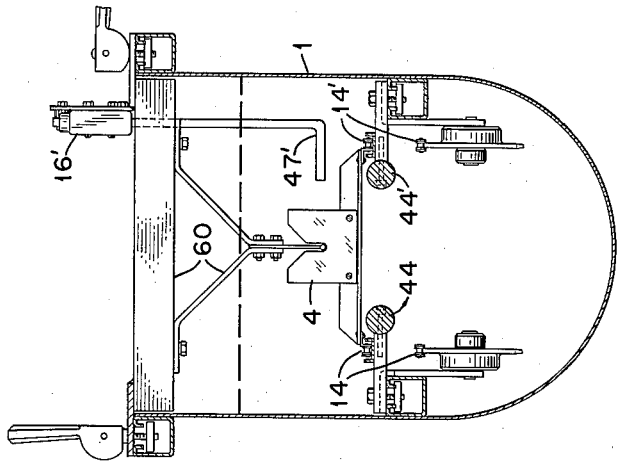

Nov. 13, 1962   J. A. KASERMAN ET AL   3,063,290
SYSTEM FOR ULTRASONIC INSPECTION OF TUBULAR OBJECTS
Filed Oct. 7, 1957                              5 Sheets-Sheet 1
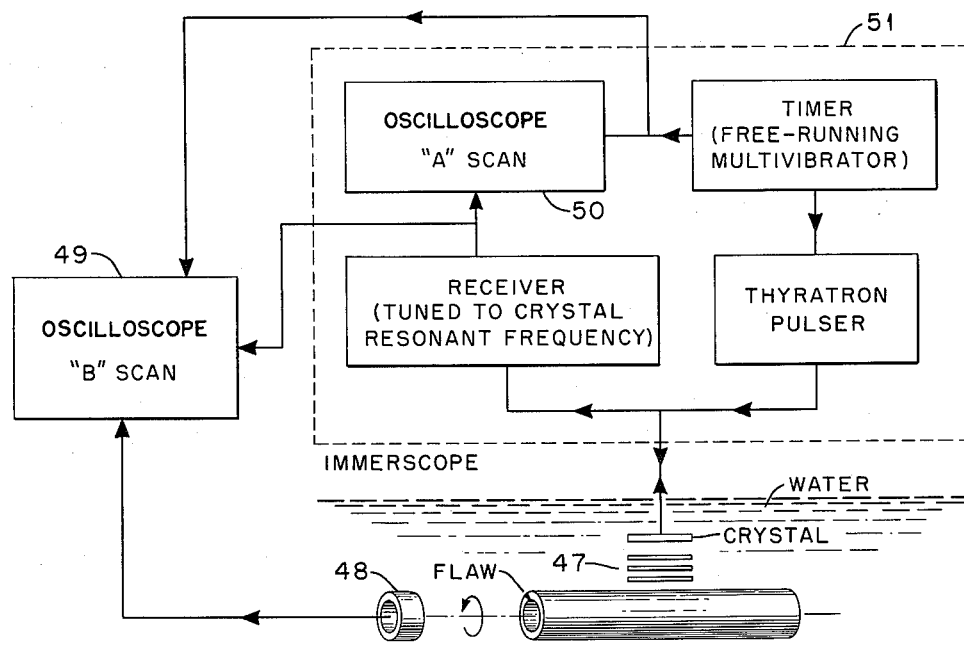
Fig. 11.
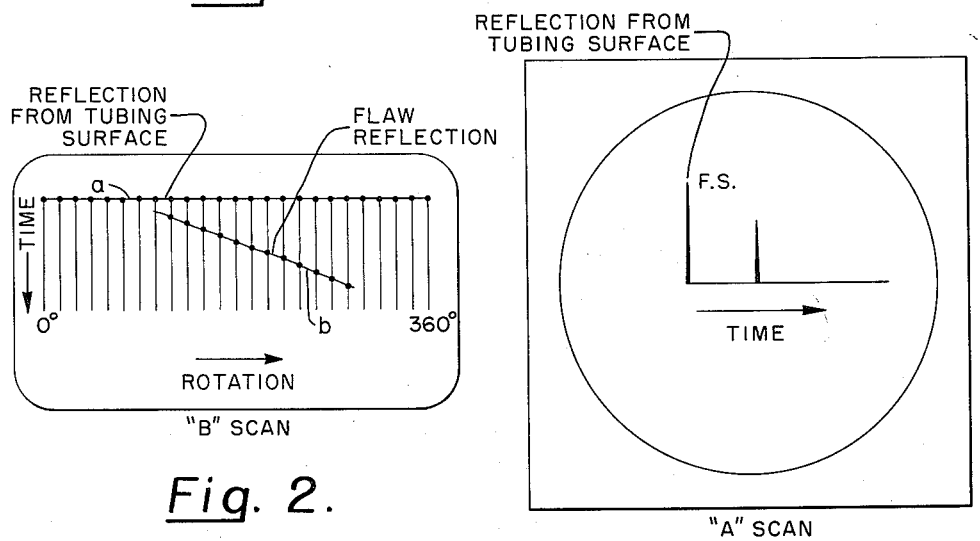
Fig. 2.
Fig. 1.
INVENTORS.
John A. Kaserman &
BY Robert B. Oliver
ATTORNEY

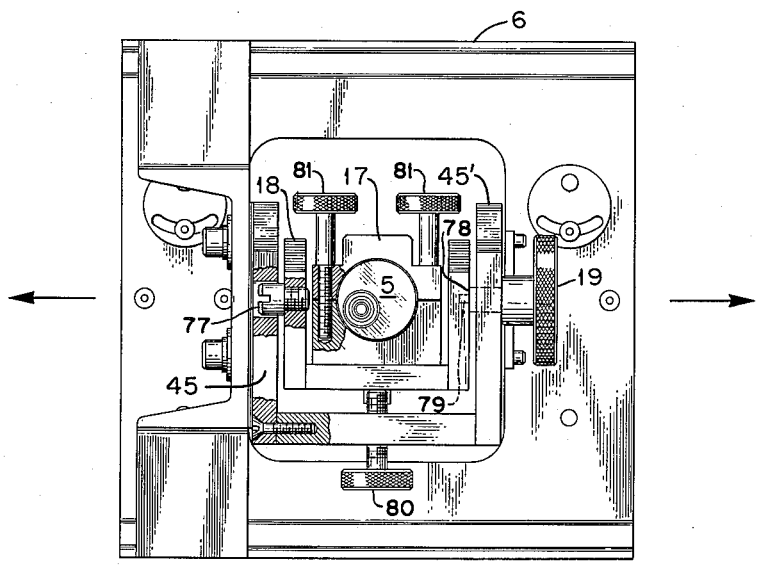
Fig. 10.
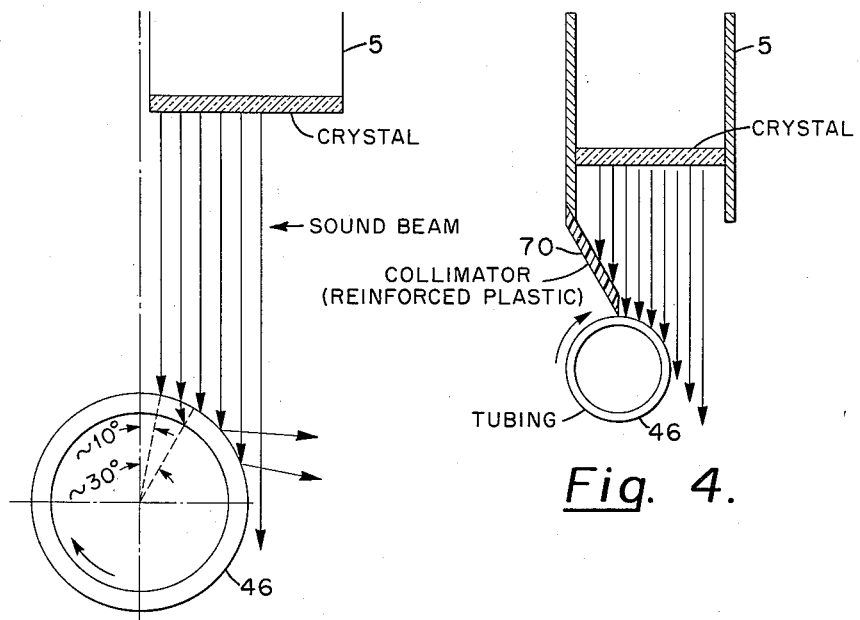
Fig. 4.
Fig. 3.
INVENTORS.
John A. Kaserman &
Robert B. Oliver
ATTORNEY

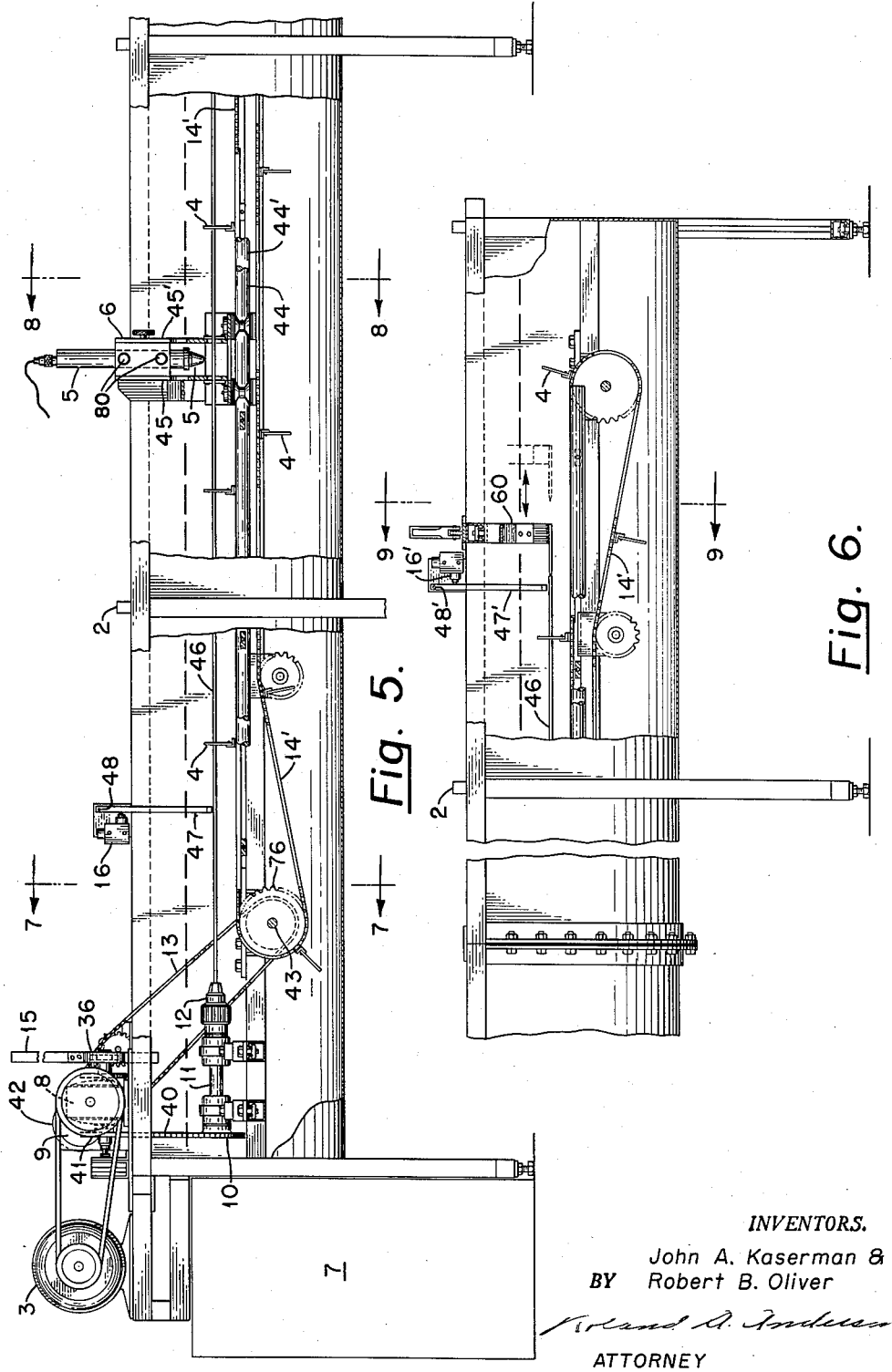

Nov. 13, 1962 J. A. KASERMAN ET AL 3,063,290
SYSTEM FOR ULTRASONIC INSPECTION OF TUBULAR OBJECTS
Filed Oct. 7, 1957 5 Sheets-Sheet 4

INVENTORS.
John A. Kaserman &
BY  Robert B. Oliver

ATTORNEY

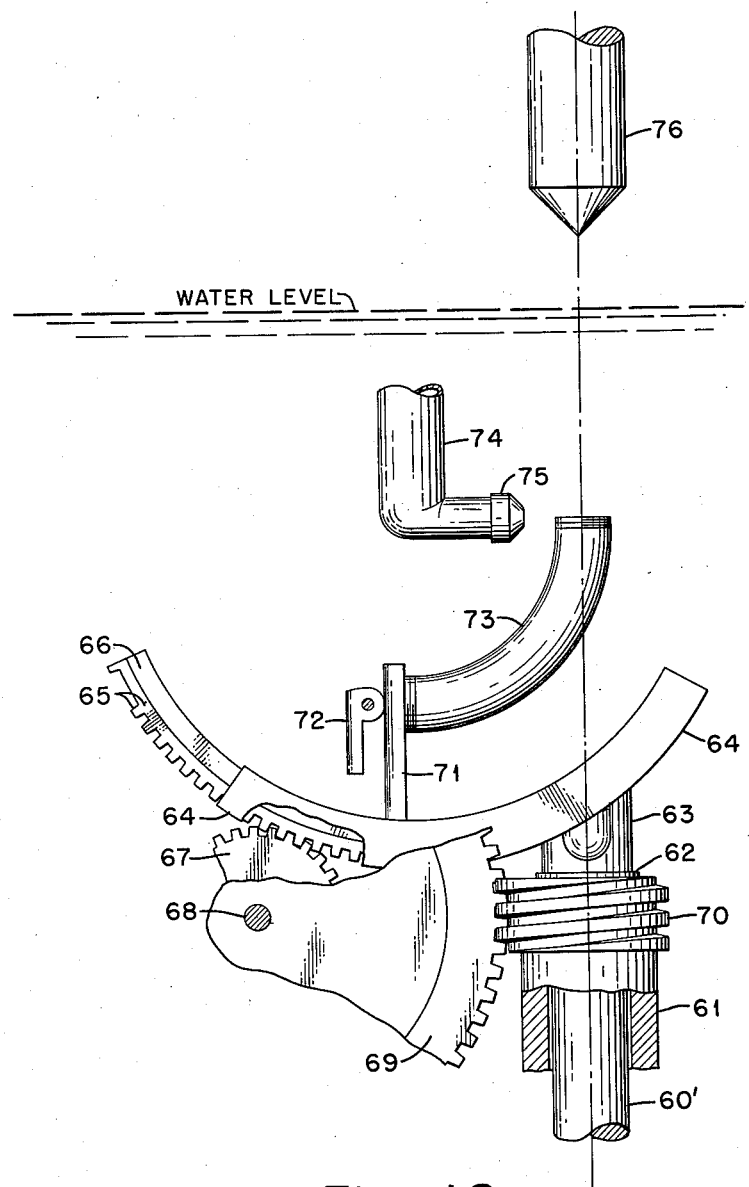

3,063,290
SYSTEM FOR ULTRASONIC INSPECTION
OF TUBULAR OBJECTS
John A. Kaserman, Knoxville, and Robert B. Oliver, Kingston, Tenn., assignors to the United States of America as represented by the United States Atomic Energy Commission
Filed Oct. 7, 1957, Ser. No. 688,788
2 Claims. (Cl. 73—67.8)

This invention relates to the inspection of pipe and tubing and more particularly to an improved apparatus for immersed ultrasonic inspection thereof.

Heretofore in the prior art it has not generally been so important to detect small defects in pipe or tubing, so that the conventional inspection methods which would serve to locate the larger flaws and defects were adequate. However, in the field of nuclear reactors a large quantity of many different sizes and shapes of pipe and tubing are used. This is inherent, since thermal energy is generated in one locality and must be transferred to some fluid for transport to another location to be converted into mechanical energy. Moreover, most of the pipe and tubing are used in quite critical regions, with both the inside and outside of the tube walls subjected to a highly corrosive atmosphere. Temperature gradients set up thermal stresses which may aid in the propagation of small defects or enhance the corrosion rate. Any leak would be extremely hazardous, both from a personnel standpoint and from the viewpoint of further damage to surrounding areas within the package. An added difficulty in connection with possible leaks within the system, is the fact that, once the unit is in operation, certain areas will no longer be accessible for any repairs, hence the necessity for rigid inspection to guarantee, insofar as possible, that the pipe or tubing used will be sound. In view of the great footage of tubular shapes and quality required, special inspection techniques are necessary.

Applicants with a knowledge of the above problems have for an object of their invention the provision of apparatus for immersed ultrasonic inspection of pipe or tubing which includes the use of a highly damped piezo electric crystal having a very high signal strength.

Applicants have as another object of their invention the provision of an immersed ultrasonic scanning system where no special transducer adapters or shoes are required when changing the size or shape of the pipe or tubing to be inspected.

Applicants have as another object of their invention the provision of an immersed scanning system for ultrasonic inspection of pipe and tubing wherein simple continuous adjustment of the incident angle of the sound beam is permitted.

Applicants have as a further object of their invention the provision of an apparatus for ultrasonic inspection of pipe and tubing wherein continuous application of a coupling liquid is not required, and where contact pressure is not a variable.

Applicants have as a still further object of their invention the provision of an immersed ultrasonic inspection apparatus for pipe and tubing which is independent of the ovalness, surface conditions, or dimensional variations of the object under inspection.

Applicants have as a still further object of their invention apparatus for immersed ultrasonic inspection of pipe and tubing wherein a sufficient water column is utilized to provide a delay line that allows a very strong initial signal to pass through the amplifier before the weaker inspection signals return to the instrument.

Applicants have as a still further object of their invention the provision of apparatus for immersed ultrasonic inspection of pipe and tubing which permits collimation of the sound beam so that the defect signal is compared with the signal from the front surface of the test object, rather than with the very strong signal transmitted by the crystal.

Applicants have as a still further object of their invention the provision of an immersed scanning system for ultrasonic inspection of pipe and tubing which may be applied to remote scanning in areas which are not readily accessible or of objects which have been subjected to radiation and are radioactive.

Other objects and advantages of our invention will appear from the following specification and accompanying drawings, and the novel features thereof will be particularly pointed out in the annexed claims.

Figure 8:
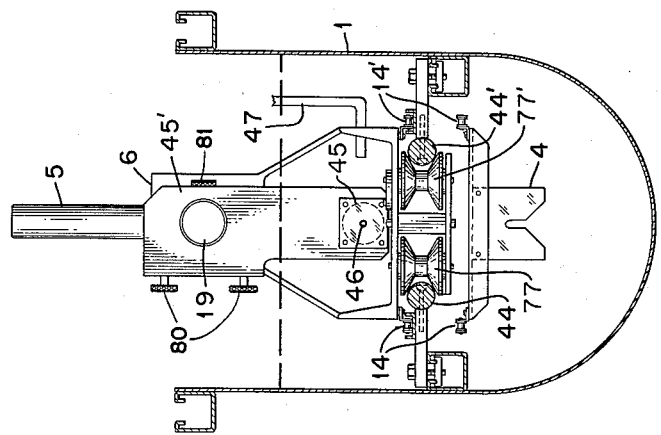
Figure 7:
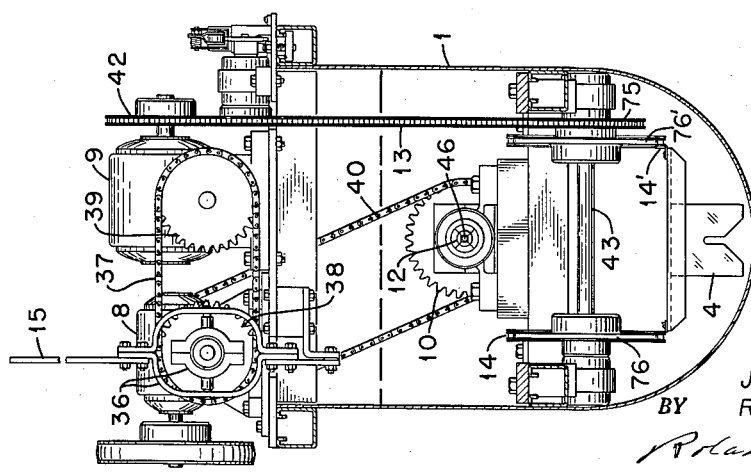

In the drawings, FIGURE 1 is a schematic of the display on the screen of a conventional A Scope used in applicants' improved system. FIGURE 2 is a schematic of the display on the sceeen of the B Scan used in applicants' improved system. FIGURE 3 is a sectional elevation of tubing showing the manner of application of sound waves thereto from a transducer. FIGURE 4 is a sectional elevation of a tubing specimen, a transducer and a mask. FIGURES 5 and 6 are elevations, partly in section of the immersion tank and mechanism for scanning. FIGURE 7 is a cross section of the immersion tank taken along the line 7—7 of FIGURE 5. FIGURE 8 is a cross section of the immersion tank of applicants' system taken along the line 8—8 of FIGURE 5. FIGURE 9 is a cross section of the immersion tank of applicants' system taken along the line 9—9 of FIGURE 6. FIGURE 10 is a plan view of the dolly and transducer tube used in our improved system. FIGURE 11 is a block diagram of the elements of the sound detector as applied to a specimen to be tested in our improved system. FIGURE 12 is a detail of the mechanism for testing component tubular objects.

It was discovered that pulse echo ultrasonic means offered the best solution to this inspection problem and required a minimum of instrumentation. Since the pipe or tubing sizes range from the order of $3/16''$ outside diameter by .025" wall thickness up to 8" outside diameter with thick walls, and since the rate of inspection was important, it was found that the immersed ultrasonic system offered the best chance of meeting this problem. Immersed testing of parts for defects in the aircraft industry was known and conventional equipment for providing ultrasonic transmission and reception was already a stock item. For instance, Curtiss-Wright produces an "immerscope" model 424-A that includes a transmitter, receiver, and display mechanism which is suitable for use in applicants' apparatus. Other companies include Sperry Products of Danbury, Connecticut, which produce suitable equipment for this purpose. Accordingly, applicants have used a commercially available pulse echo ultrasonic transmitter and receiver in their system, and do not claim that any novelty exists therein except for the provision of a B Scan arrangement. Any other suitable form of transmitter and receiver could be substituted for the one selected by applicants for use in their system. However, it was found, as will be pointed out hereinafter, that the conventional equipment was not suitable for the faster speeds of inspection contemplated by applicant for smaller pipe. Therefore, it was necessary to modify the conventional system by providing a B Scan to provide reliable information over the ranges of size and speed that were necessary for applicants' system.

In general, applicants employ a transducer which serves as a transmitter and includes a piezo electric crystal (lithium sulfate, quartz, etc.) that operates to convert electrical shock (energy) into the mechanical vibrations at very high ultrasonic frequency. In such an arrangement transmitting time is in the order of one micro-second and with a much longer interval for listening. The interval between pulses is purposely made long with respect to pulse length. The transducer is positioned with respect to the pipe or tubing under inspection so that waves therefrom will strike the specimen at an angle of incidence from 10° to 30°. The sound waves penetrate the tubing and are refracted according to Snell's law and will follow the contour of the wall of the tubing since the wall acts as a conducting medium for sound. When the sound wave from the transducer initially contacts the tubing a portion of the sound wave is reflected from the surface of the tubing back to the transducer and the echo is displayed on an A Scope as a vertical pip. FIGURE 1 shows this in schematic form where the vertical scale is, magnitude of the signal, and the horizontal scale is time. The pip, marked FS, indicated in the extreme left portion of the scope screen is the indication that will be given on the A Scan. When there is no crack or other flaw in the pipe there will be no other reflection than that indicated above from the surface of the pipe or tubing. However, if there is a crack or scratch or other flaw, the wave will contact the inter-face of the crack or scratch and will be reflected back. As the pipe or tubing rotates, the crack is moved either nearer or farther from the transducer, depending upon its initial position, and the reflection from the inter-face will appear as a smaller vertical pip on the A Scan screen, but as the pipe or tubing moves, the reflection will move along the A Scan as the time of echo changes. Now, if the pipe or tubing is rotating at a fast rate, the indication which takes the form of a pip will move across the A Scope so rapidly that it will be difficult to follow. For very high speeds of rotation, inspection carried out on the A Scope will, therefore, be very difficult. In order to overcome the difficulty and to sustain the indication from the inter-face of the crack or flaw, applicants have provided a B Scan and have coupled it into the system in such a manner as to sustain the echo signals for various speeds of rotation.

FIGURE 2 shows a typical B Scan where time in indicated vertically and rotation is indicated horizontally. The B Scan is, in effect, an integrating group of A Scans where the upper points are front surface echo signals and give the appearance of a horizontal line *a*. The reflected signals from cracks or flaws make a series of points upon the scope to give a diagonal line *b*. Any defect which will offer a reflecting inter-face to the sound beam can be detected. However, the above system is best suited for radial cracks or defects. A non-radial defect will give an indication of a different size for signals propagated in opposite directions around the tubular specimen, i.e., a stronger reflected signal from the sound waves travelling in one direction than those travelling in the opposite direction around the tube wall. When a defect of the non-radial type is encountered it is necessary to inspect the pipe or tube in both directions, that is, position the transducer so that it transmits sound waves in one direction around the wall of the tube and then reposition it so that it will transmit sound waves in the opposite direction around the tube wall. Some of the defects encountered, are cracks, laps, folds, seams, marks, or scratches. The applicants' detecting device, however, does not distinguish between these types of defects, and other methods of analysis must be employed to determine their character once they have been detected by applicant's system. The optimum beam width has been found to be at least one-sixth of the diameter of the pipe or tubing.

It is necessary to bring the sound from the transducer in at an angle to the radius of the pipe. This is indicated in FIGURE 3 herein. For the inspection of tubular shapes 46, the transducer 5 is aligned so that the sound beam produces a range of the incident angles that is optimum for the particular ratio of wall thickness to diameter of the specimen and for the velocity of sound propagation peculiar to the material being inspected. The range of 10° to 30° is typical, with the lower third of this range showing preferential sensitivity to inside diameter defects, and the upper third offering the greatest sensitivity to outside diameter defects. The purpose of limiting incidence angles is three-fold. Small angles of incidence, particularly those less than 10°, set up stronger reverberations across the tube walls that are undesirable because such reverberations mask the defect indications. Unwanted Rayleigh (or Surface) waves that might inordinately emphasize the shallow outside diameter defects are minimized by eliminating large angles. In order to interpret both inside diameter and outside diameter defects on the same basis, a balance must be struck between the angular ranges that are sensitive to each. This is achieved by careful adjustment of the ranges of angles to be used within the limits indicated by the other two considerations mentioned above. The proper alignment of the transducer with reference to the axis of rotation of the tubular objects should be performed on a sample length of the same size having similar longitudinal notches milled on both inner and outer surface to a depth comparable to that of the rejectable defects and at points on the same circumference. The transducer should be positioned to see each of the notches with comparable signal strength when the reference defect signals are the same distance from the front surface signal.

As will be seen in FIGURE 4 a mask 70 is provided on the transducer 5 to limit the passage of sound waves to a certain predetermined portion of the tubing. In this instance, the mask is so positioned that the sound waves are limited to application to the right half of the tubing wall, but since the transducer tube 5 may be rotated 180° or more, the mask may be repositioned so that it permits sound waves from the transducer to impinge upon the opposite half of the tubing 46. The use of the mask or collimator is particularly desirable where the diameter of the tubing being inspected is of the same order of magnitude as or smaller than the diameter of the transducer being used. The collimator 70 is used to restrict the sound beam to the proper range of angles. Also, when an uncollimated transducer is properly aligned only the heel of the transducer is being utilized. Thus, the effective width of the transducer is not the diameter of the crystal but is a cord of the transducer. This is, then, the limiting factor in the linear translation of the transducer per revolution if full coverage is to be maintained. If proper collimation is used, the effective width then approaches the transducer diameter and the linear translation is limited only by the diameter. When dealing with larger pipe sizes, this becomes unnecessary because the radius of the pipe is large compared with that of the transducer and the effect is a natural collimation. The mechanical equipment for the inspection of tubing must hold the transducer in proper alignment at all times, and it must translate the transducer along the length of the pipe or tubing at such a rate that the entire surface of the test object is covered by the sound beam. If the tube is rotated at about 240 r.p.m. and a ¾" transducer is moved at about .25 inch per revolution, this is a scanning speed of about five feet per minute. Rotational speeds for the pipe or tubing of 300 r.p.m. or more are possible and, if larger defects are acceptable, the scanning pitch could be increased to .7 inch per revolution. Under these conditions scanning speeds up to 18 feet per minute are possible.

Referring to FIGURES 5-9 of the drawings in detail, 1 designates an elongated tank or trough of sufficient length to accommodate the usual commercial lengths of pipe or tubing. Racks 2 are positioned on either side of tank 1 to receive a supply of tubing to be inspected. A variable speed A.C. or D.C. motor 3, shown in FIGURE 5, is employed to supply power for operation of gear reduction boxes 8, 9. It is directly connected to gear reduction box 8 through a V-belt and pulleys. As indicated in FIGURE 7, a gear reduction box 8 is coupled to a data potentiometer which provides a rotational signal to the B Scan and to gear reduction box 9 through conventional clutch 36 controlled by handle 15, chain 37 and sprockets 38, 39. The gear box is also coupled through chains 40, and sprockets 10, 41 to a shaft 11 which is mounted in conventional bearings and carries a "Jacob" chuck 12 for receiving and rotating lengths of pipe to be tested. As shown in FIGURE 7, gear reduction box 9 carries a sprocket 42 which is linked through chain 13 to a sprocket 75 on shaft 43 which serves to mount a pair of spaced sprockets 76, 76' that carry endless roller chains 14, 14'. Thus, they pass over similar sprockets on a shaft mounted adjacent the opposite end of trough or tank 1. The roller chains 14, 14' extend the length of the tank or trough and attached to and bridging them at intervals are reinforced plastic guideplates or brackets 4 which serve to receive and support a length of pipe or tubing to be inspected. Also bridging the chains 14, 14' and secured to them is a scanner dolly 6 in which is held the ultrasonic search tube 5 that carries the transducer. The dolly 6, shown in FIGURE 8, carries rollers 77, 77' that ride upon rails 44, 44'. Attached to the dolly 6 are a pair of spaced plates 45, 45' containing "Teflon" bushings machined to receive and fit the outer walls of the tubing or pipe 46 being inspected. As they are located on either side of the transducer, they provide an additional steady influence on the small diameter tubing. This is important since the sound should be propagated at the same incidence angle throughout the specimen. These supports tend to keep pipe in the same relation to the transducer and insure that it is not distorted out of the desired range. A movable tail stock 60, shown in FIGURE 9, is also provided to prevent excessive whip of the tubing specimen as it is rotated. One end of the tubing to be inspected is mounted in the "Jacob" chuck 12 which serves to rotate it. The chuck 12, guideplates 4, spaced plates 45, 45', and tail stock 60, all cooperate in holding the tubing in proper alignment under the transducer tube 5. As the tubing is rotated the scanner dolly 6 and transducer are translated along the length of the tubing at a definite ratio of rotation to linear speed, determined by the gear reducer and sprockets; thus, the locus of incident points of the ultrasonic beam is a spiral path along the tubing as it is inspected. Sufficient overlap is taken per rotation to assure complete coverage.

A cabinet 7 houses an electronic speed regulator and rectifiers necessary for the variable speed regulation of the D.C. motor 3. By using a variable speed motor 3, the rotational speed of the tubing undergoing inspection is regulated.

When the inspection apparatus is in operation, the tank 1 is filled with a suitable ultrasonic wave coupling medium, such as water, with preferably a rust inhibitor and a wetting agent added. The water level is maintained in the tank 1 slightly above the tubing guides 4. The water in tank 1 serves three purposes: (a) it serves as a medium for the transmission of ultrasonic waves from the transducer 5 to the tubing undergoing inspection; (b) it couples the transducer to the tubing, because the water conforms to the contour of the tubing; (c) it absorbs the sound waves that do not penetrate the tubing walls, thus, eliminating the possibility of these waves being picked up by a sensitive crystal in the transducer 5 and giving an erroneous wave pattern on indicator screens used in conjunction with the transducer 5.

A tube to be inspected is placed into the guides 4 and one end is inserted into the jaws of the "Jacob" chuck 12 which is tightened by hand. A short section of Tygon or other soft non-metallic tubing may be inserted between the chuck jaws of the tubing, being rigidly held to prevent damage to the tubing. When the motor 3 is started, the tubing is rotated by the means above described.

Gear reduction box 9, suitably linked with gear box 8, as described above, moves the transducer horizontally along the tubing. It will be readily seen that with the proper gear ratio between the two gear reduction boxes 8 and 9, the transducer is scanning the tube at a predetermined pitch. Thus, a helical spiral inspection pattern is being circumscribed around the tubing, and as previously explained, in order to insure that every section of the tubing will be properly inspected, each rotational scan made by the transducer 5 partially overlaps the previous one. To further insure that each section of the tubing will be properly inspected, the transducer is allowed to move horizontally along the tubing to the end opposite the chuck. Then, by means of a clutch 36, manually operated by a control handle 15, the transducer is started or stopped, while the direction of rotation of the tubing and direction of travel of the transducer is reversed by reversing the direction of rotation of the drive motor 3, so that the specimen may be inspected in the opposite direction. However, when this latter action is taken, the position of the transducer, with respect to the tubing, must be reversed so that waves are sent into the other side of the tubing in the reverse direction, as previously indicated in connection with FIGURE 4. By the proper movement of the control handle 15, the clutch is disengaged, thus, stopping the drive to gear box 9 and the linear travel of the transducer dolly 6. The direction of rotation of the motor 3 is then reversed and the clutch engaged, causing the rotation of the tubing and the linear travel of the transducer 6 to be reversed. A commercially available electrical snap switch 16, mounted adjacent either end of the tank or trough, is operated to stop the motor 3 when the transducer 5 reaches a position near either extremity of the tank by lever 47, pivoted at 48 and actuated through engagement of its lower end with dolly 6. The inspection of tubing is automatic. Once the tubing is placed into the guides 4, and one end rigidly held by the chuck 12 with the clutch 36 engaged, the transducer 5 automatically moves along the tubing. It is only necessary for the operator to watch the wave patterns on the screen of cathode ray tube A Scan 50 and on the screen of the B Scan 49 for indications of flaws.

The mounting for the transducer tube 5 in the dolly 6 is well shown in FIGURE 10. This mounting serves to hold the transducer in proper alignment over the tubing during each type of inspection. Adjustment is provided for so that the transducer tube 5 may be adjusted to the desired angle or position with respect to the specimen to be tested. The transducer tube 5 may be vertically moved up or down and held rigid in the adjusted position by means of a vise chuck 17 which has appropriate adjusting screws 81, 81 for urging the two parts of the chuck towards each other. Likewise, the inner-fixture frame 18 is pivoted near the top on screw 77 and rigidly held in adjusted position by means of lock screw 19 having reduced extension 79 that acts as a pivot for swinging frame 18, and shoulder 78 which engages the frame and with stop screws 80 locks it into position, so that the transducer will be at the proper angle above the tubing. As shown in FIGURES 5, 8 and 10 stop screws 80 thread through the upper and lower part of frame 45 and engage inner frame 18 to limit its movement.

The block diagram of FIGURE 11 indicates the relation of the receiving system to the tubing or pipe to be tested. As previously indicated the immerscope, indicated by reference 51 is of conventional form and coupled into this system is a B type of scan. Timing signal is applied from the multivibrator in the immerscope to the vertical plates of the B Scan oscilloscope. Video signal is supplied to the intensity grid or other electrode from the receiver in the immerscope. The B Scan 49 receives a rotational signal on its horizontal plates from the data potentiometer 48, as indicated above, since this potentiometer is coupled to the driving mechanism which rotates the pipe or tubing specimen and is actuated as rotation of the specimen takes place. The conventional A Scan presentation found on most ultrasonic flaw detection instruments of the conventional type presents the instantaneous signal intensity as a function of the time-of-travel or distance travelled by the sound. Since, for the inspection of pipe and tubing, the sound is channeled around the circumference in the wall of the object or specimen, the signal from a defect in the rotating pipe or tubing travels horizontally across the A Scan scope 50. With high rotational speed of the specimen being tested, it is difficult to detect these rapidly moving defect signals on the scope of the A Scan and impossible to evaluate their magnitude. The B Scan instrument samples the A scan pattern 300 to 1000 times per second and presents this information on the vertical sweep of the B Scan scope 49. The horizontal sweep of the B Scan is driven by a position signal supplied from the potentiometer of the mechanical scanning equipment. This method of presentation is somewhat similar to a stroboscope and, as such, is nearly independent of scanning speed. If a plate were being inspected, the B Scan would present an instantaneous cross-section of that part. If, when scanning the tubing and pipe, a rotational signal is used to actuate the horizontal sweep, any defect moving with the pipe will produce a signal that moves across the screen. This moving defect is also changing its distance from the transducer, which shows on the vertical sweep. The combination of these two sweeps is a defect signal that is an inclined line on the face of the B Scan oscilloscope 49 as indicated at b of FIGURE 2. The length and brilliance of the inclined line are indicative of the depth and size of the defect. The very high persistence P 19 phosphor on the screen of the presentation tube was selected because of its brilliance and slight memory. That is, a defect which may flash on the screen for a time of approximating .05 second or less, may be retained as an image for as long as one second and, thus, the possibility of the operators detecting this defect signal is increased considerably; at the same time, operator strain and fatigue are eased.

Due to the non-linearity of the various electronic circuits, none of the ultrasonic instruments gives a linear relation between signal strength and defect size. Also, unless a properly adjusted sensitivity-time-control circuit is used, the signal received from similar defects at various depths will vary as a function of the distance below the front surface of the test object. For these reasons, any evaluation of defect size should only be a comparison with the known defect in the same material having a similar mechanical and thermal history, and the known defect should simulate the defect being evaluated. Since the common defect in pipe or tubing is a longitudinal crack, a very narrow longitudinal notch is used as a reference. At best, this is only a gauge to tell whether the defect appears to be larger or smaller than the reference notch. Comparisons with various inspection and metallographic standards reveal the approximate defect size of the reference standard.

In addition, it will be apparent from FIGURE 12 that shapes other than length of tubing or pipe may be inspected by this system. For instance, an elbow may be progressively circumscribed by a helical spiral around a given axis perpendicular to a given point. This development relates more particularly to a means whereby a 90° elbow or other angular shape of tubing may be inspected. It is contemplated that the specimen will be rigidly held and rotated in such a manner that it may be inspected for flaws and defects by an ultrasonic scanning device of the type heretofore described. In FIGURE 12 of the drawings, 60' designates an inner shaft, connected to a conventional drive means (not shown), which is positioned within a stationary vertically disposed outer shaft 61. A sleeve bearing 62 is fitted between the shafts 60' and 61. A stationary worm 70 is rigidly attached at the upper extremity of the outer shaft 61. The upper portion 63 of the inner shaft 60' is machined to a slightly larger diameter, and is rigidly attached to an arcuately disposed rack guide 64. A rack 65 is slidably engaged within the rack guide 64. An arcuate rib 66 slidably engages within an arcuate groove (not shown) of the same radius, within the rack guide 64. Meshed with rack 65 is a pinion 67. The pinion 67 is rigidly attached to a rotatable shaft 68, rigidly attached by a bracket (not shown) to the rack guide 64. Also, a worm wheel 69 is rigidly attached to the shaft 68, meshing with the stationary worm 70. Rigidly attached to the inner radius of the rack 65, through a slot in the rack guide 64, is a rectangular shaped bracket 71. The bracket 71 is slotted (not shown) so that an expansion-type clamp 72 can be used to rigidly hold a pipe or tubing elbow 73 in place during inspection. A conventional or commercially available scanning device 74 with a right angle search unit head 75 is positioned by any suitable means (not shown) so as to be used to scan the elbow for flaws and defects. A vertically adjustable centering head 76 is positioned and aligned by any suitable means (not shown) on the centerline of the rotating inner shaft 60, so that an elbow may be readily brought into proper alignment before being clamped into place.

As the shaft 60' is rotated, the worm wheel 69 is rotated around the stationary worm 70. Thus, the worm wheel 69 is rotated around its axis, meshing with the stationary worm 70, driving the pinion 67. The pinion 67 meshes with the rack 65 and moves the rack within the rack guide 64, thus, moving the elbow 73, undergoing inspection, progressively upward as it is being rotated. The rack is designed to move within the rack guide 64 only to a point whereby the scanning device 74 will have inspected about three quarters of the length of the elbow 73. The pinion 67 will not move the rack 65 past this point because of the absence of teeth on the rack 65. When the pinion 67 has reached this point on the rack 65, it is necessary that the direction of rotation of the inner shaft 60 be reversed so that the elbow 73 may be inspected while being returned to the position shown in FIGURE 12. It can be readily seen that a suitable electrical or mechanical stopping device may be used to stop rotation of the shaft 60 when it reaches a desired position. It is then necessary that the elbow 73 be reversed and the opposite end placed on the clamp expander 72 so that the opposite portion of the elbow may be inspected.

Having thus described our invention, we claim:

1. An ultrasonic system for inspection of tubular objects comprising an elongated container for the reception of a coupling liquid to form a bath, movable supports disposed within the container along the length of the object for supporting it, means for rotating the tubular object immersed in the bath, a transducer positioned in contact with the liquid of the bath for transmitting pulses of high frequency sound waves to the object as it rotates and for receiving echoes reflected from the object, a dolly mounted in the container and movable with respect thereto in synchronism with the supports for transporting the transducer along the axis of the object to progressively scan it as it is rotated, means for applying a beam of sound waves to the object of sufficient breadth to cover a range of incident angles, and means coupled to the transducer and responsive to signals therefrom for displaying the received echoes.

2. An ultrasonic system for immersed inspection of lengths of tubular objects comprising a container having a bath of coupling liquid, means for mounting and rotating a tubular object immersed in the liquid of the bath, spaced movable supports for supporting the object along its length, an ultrasonic pulse echo means including a transmitter and receiver positioned in the container in contact with the liquid for applying a beam of sound waves of breadth sufficient to cover a range of angles of incidence to the object as it rotates, a pair of spaced rails positioned in the container and extending substantially coextensive therewith and longitudinally of the object to be inspected, a dolly mounted on said rails for reception of the transmitter and receiver, and means for moving the dolly along the rails in synchronism with the movement of the movable supports to progressively move the transmitter and receiver parallel to the object for scanning it as it rotates, and means coupled to the ultrasonic pulse echo means and responsive to signals therefrom for detecting flaws in the object.

References Cited in the file of this patent

UNITED STATES PATENTS

| | | |
|---|---|---|
| 2,593,865 | Erdman | Apr. 22, 1952 |
| 2,740,289 | Van Valkenburg et al. | Apr. 3, 1956 |
| 2,795,133 | Ots | June 11, 1957 |
| 2,908,161 | Binder | Oct. 13, 1959 |
| 2,940,305 | Williams et al. | June 14, 1960 |

FOREIGN PATENTS

| | | |
|---|---|---|
| 696,920 | Great Britain | Sept. 9, 1953 |
| 765,906 | Great Britain | Jan. 16, 1957 |

OTHER REFERENCES

Periodical, Electronics, December 1947 issue, pp. 102–105. (A photostatic copy is in Div. 36.)